(12) United States Patent
Basit et al.

(10) Patent No.: US 11,836,363 B2
(45) Date of Patent: *Dec. 5, 2023

(54) BLOCK ALLOCATION FOR PERSISTENT MEMORY DURING AGGREGATE TRANSITION

(71) Applicant: NetApp Inc., San Jose, CA (US)

(72) Inventors: Abdul Basit, Morrisville, NC (US); Ananthan Subramanian, San Ramon, CA (US); Ram Kesavan, Los Altos, CA (US); Matthew Fontaine Curtis-Maury, Apex, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,793

(22) Filed: May 23, 2022

(65) Prior Publication Data
US 2022/0283718 A1 Sep. 8, 2022

Related U.S. Application Data

(63) Continuation of application No. 16/911,425, filed on Jun. 25, 2020, now Pat. No. 11,340,804.

(51) Int. Cl.
*G06F 3/06* (2006.01)
(52) U.S. Cl.
CPC .......... *G06F 3/0631* (2013.01); *G06F 3/0604* (2013.01); *G06F 3/064* (2013.01); *G06F 3/065* (2013.01); *G06F 3/0679* (2013.01)
(58) Field of Classification Search
CPC ...... G06F 3/0631; G06F 3/065; G06F 3/0679; G06F 3/0604; G06F 3/0647

USPC ......................................................... 711/162
See application file for complete search history.

(56) References Cited

U.S. PATENT DOCUMENTS

| | | | |
|---|---|---|---|
| 10,394,485 B1 * | 8/2019 | Chen ....................... G06F 3/061 |
| 10,459,806 B1 * | 10/2019 | He .......................... G06F 3/065 |
| 11,036,677 B1 * | 6/2021 | Grunwald ............... G06F 3/067 |
| 11,340,804 B2 * | 5/2022 | Basit .................. G06F 11/2097 |
| 2011/0314219 A1 | 12/2011 | Ulrich et al. |
| 2012/0303685 A1 | 11/2012 | Ulrich et al. |
| 2018/0217756 A1 * | 8/2018 | Liu ....................... G06F 3/0683 |
| 2020/0409583 A1 | 12/2020 | Kusters et al. |

* cited by examiner

*Primary Examiner* — Than Nguyen
(74) *Attorney, Agent, or Firm* — COOPER LEGAL GROUP, LLC

(57) ABSTRACT

Techniques are provided for block allocation for persistent memory during aggregate transition. In a high availability pair including first and second nodes, the first node makes a determination that control of a first aggregate is to transition from the first node to the second node. A portion of available free storage space is allocated from a first persistent memory of the first node as allocated pages within the first persistent memory. Metadata information for the allocated pages is updated with an identifier of the first aggregate to create updated metadata information reserving the allocated pages for the first aggregate. The updated metadata information is mirrored to the second node, so that the second node also reserves those pages. Control of the first aggregate is transitioned to the second node. As a result, the nodes do not attempt allocating the same free pages to different aggregates during a transition.

20 Claims, 12 Drawing Sheets

BLOCK ALLOCATION FOR PERSISTENT MEMORY DURING AGGREGATE TRANSITION

RELATED APPLICATION

This application claims priority to and is a continuation of U.S. patent application Ser. No. 16/911,425, titled BLOCK ALLOCATION FOR PERSISTENT MEMORY DURING AGGREGATE TRANSITION" and filed on Jun. 25, 2020, which is incorporated herein by reference.

BACKGROUND

A computing environment may host one or more nodes, such as servers, virtual machines, computing devices, etc., for storing data on behalf of clients. The nodes may be deployed in a manner that provides high availability, data redundancy, and/or other storage features. For example, a first node may host one or more aggregates within which data is stored, such as a first aggregate used to store data on behalf of a first client. The first node may store at least some data of the first aggregate within a first persistent memory of the first node. A second node may also host one or more aggregates within which data is stored, such as a second aggregate used to store data on behalf of a second client. The second node may store at least some data of the second aggregate within a second persistent memory of the second node.

The first node and the second node may be configured as a node pairing (e.g., a high availability node pairing) configured to provide high availability and/or failover functionality. For example, if one of the nodes fails, then the surviving node can provide clients with failover access to their data in place of the failed node. This can be accomplished by mirroring data between the persistent memories of the nodes so that the surviving node has an up-to-date copy of data from a persistent memory of the failed node. In this way, the surviving node can provide clients with up-to-date data that was previously accessible to the clients through the failed node.

DETAILED DESCRIPTION

Figure 1:
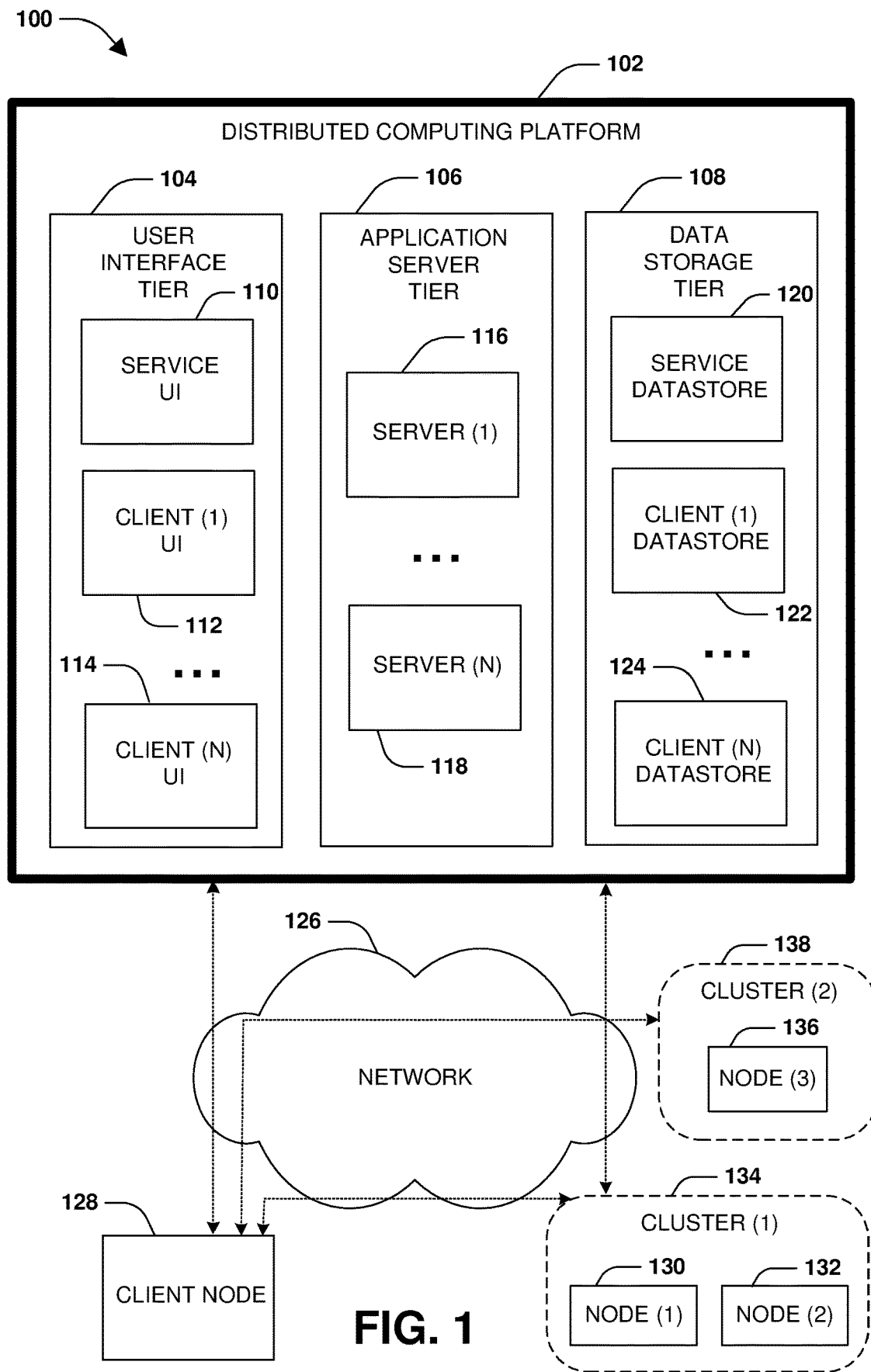
FIG. 1 is a block diagram illustrating an example computing environment in which an embodiment may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A first node may be implemented as a computing device, a server, an on-premise device, a virtual machine, hardware, software, or combination thereof. The first node may store client data within one or more aggregates, such as a first aggregate and a second aggregate. In order to provide high availability and redundancy, the first node may be paired with a second node. The second node may also store client data within one or more aggregates, such as a third aggregate and a fourth aggregate. Data is mirrored between the first node and the second node, such as between a first persistent memory of the first node and a second persistent memory of the second node, so that both nodes have up-to-date data of the other node.

For example, the first persistent memory may be partitioned into a first local partition into which data of the first aggregate and the second aggregate may be stored. The first persistent memory may be partitioned into a first remote partition into which data of the third aggregate and the fourth aggregate is mirrored from the second persistent memory of the second node (e.g., from a second local partition of the second persistent memory). Similarly, the second persistent memory may be partitioned into the second local partition into which data of the third aggregate and the fourth aggregate may be stored. The second persistent memory may be partitioned into a second remote partition into which data of the first aggregate and second aggregate is mirrored from the first local partition of the first persistent memory of the first node.

Because data is mirrored between the persistent memories of the nodes, the nodes may be capable of providing takeover and giveback functionality. For example, if one of the nodes fails, then the surviving node can take over aggregates of the failed node using up-to-date data within the remote partition of the persistent memory of the surviving node. Once the failed node has recovered, the surviving node can give back control of the taken over aggregates to the recovered node.

For example, the first node may fail, and the second node may take over the first and second aggregates from the first node. The second node may scan the second remote partition of the second persistent memory, corresponding to the mirrored data of the first and second aggregates, to build a free pages list of free pages within the second remote partition that can be subsequently allocated to store data directed to the first and second aggregates. In this way, the second node will service I/O directed to the first and second aggregates using the second remote partition. Once the first node recovers from the failure, the second node may perform a giveback procedure to return the first and second aggregates to the first node one at a time. Also, once the first node has recovered, a resynchronization procedure is performed to copy data of the second remote partition of the second node into the first local partition of the first node in order to mirror changes to the first and second aggregates made while the first node had failed and the second node had taken over control of the first and second aggregates. Furthermore, the second node actively mirrors I/O data, directed to the first and second aggregates and being processed by the second node using the second remote partition, to the first local partition of the first node.

In certain situations, data corruption can result during the transition of aggregates between nodes, such as during a giveback procedure or a planned takeover. Continuing with the example, if for some reason merely control of the first aggregate is transferred back to the first node and control of the second aggregate is retained by the second node, then data corruption/loss can occur. This is because the second remote partition of the second persistent memory of the second node is kept as an exact mirror of the first local partition of the first persistent memory of the first node. However, the first node is serving I/O directed to the first aggregate using the first local partition and the second node is serving I/O directed to the second aggregate using the second remote partition. It is possible that the first node, servicing I/O to the first aggregate using the first local partition, may write to a page block number (e.g., a free page within the first local partition corresponding to page block number 500) that is the same page block number to which the second node is writing to while servicing I/O to the second aggregate using the second remote partition (e.g., a free page within the second remote partition corresponding to the page block number 500). Data corruption occurs in this example because only one version of the data may be persisted (data loss) once the first local partition and the second remote partition are mirrored to one another so as to prevent a mismatch of data where page block number 500 of the first local partition has different data than page block number 500 of the second remote partition (data corruption).

Accordingly, as provided herein, data corruption and data loss is avoided when transitioning control of aggregates between nodes during a giveback of aggregates between the nodes, a takeover (planned takeover) of aggregates between the nodes, or any other scenario where control of one or more aggregates is being transitioned between nodes. In an embodiment, when the second node determines that control of an aggregate (e.g., the first aggregate or the second aggregate originally owned/controlled by the first node) is to be given back from the second node to the first node, the second node allocates a portion of available free storage space within the second remote partition of the second persistent memory of the second node. The portion of available free storage space comprises a set of free pages within the second remote partition of the second persistent memory of the second node that are now being allocated/ reserved for subsequent use when processing and/or mirroring data of I/O directed to the aggregate. The set of free pages are removed from a free pages list maintained by the second node for the second persistent memory, such as where page block numbers used to index the set of free pages are removed from the free pages list.

The second node updates metadata information, corresponding to the second persistent memory, for the set of free pages with an identifier of the aggregate to create updated metadata information reserving the allocated pages for the aggregate. For example, the page block numbers used to index the set of free pages are tagged with the identifier of the aggregate so that the updated metadata information specifies that those page block numbers are being reserved for the aggregate. The second node transmits the updated metadata information to the first node.

The first node uses the updated metadata information to build a free pages list of free pages for the aggregate to use from the first local partition. The first node builds the free pages list by traversing the updated metadata information and by adding entries tagged with the identifier of the aggregate to the free pages list. Any subsequent allocations of free pages from the first local partition to store I/O directed to the aggregate and processed by the first node will use free pages within the free pages list, corresponding to those pages that were previously reserved and available within the second remote partition of the second persistent memory of the second node. In an embodiment, the free pages list is used until all aggregates whose control are to be transitioned have successfully been transitioned from the second node to the first node. In this way, the first local partition and the second remote partition implement a temporary soft partition of free pages reserved for the aggregate during a transition window of transitioning control of the aggregates. The second node then transfers control of the aggregate to the first node.

If for some reason control of the aggregate does not transfer to the first node, then both the first node and the second node have the same free pages lists to use for respectively reserving pages within the first local partition and the second remote partition for subsequent allocation for the aggregate (e.g., the aggregate whose control was retained by the second node) and another aggregate (e.g., an aggrade whose control was passed to the first node) even though the second node will continue to process the I/O directed to the partition based upon retaining control of the partition. In this way, data corruption/loss is avoided because the same free pages (the same page block numbers) are reserved by both nodes for the partition. For example, control of a first aggregate may be retained by the second node (e.g., due to a failure to transition control of the first aggregate) but control of a second aggregate may be successfully transferred back to the first node. Without the reservation of the same free pages for storing data of the first aggregate, data corruption/loss could otherwise occur where the first node tries to allocate a free page for the second aggregate that is the same as a free page being allocated by the second node for the first aggregate.

This partitioning of the first persistent memory and the second persistent memory may be performed during a transition window of transitioning control of aggregates between nodes. This partitioning may be referred to as a soft partition because it may be determined in real-time during the transition window as opposed to being a hard set partition. After the transition window, the soft partition may be removed such that there is normally no partition of storage between aggregates controlled by the same node (e.g., no partition within a local partition of persistent memory and/or no partition within a remote partition of the persistent memory), which provides improved flexibility for managing persistent memories of the nodes. Furthermore, the nodes do not have to maintain a centralized free list that is updated using inter-node communication, which simplifies the ability to avoid data corruption and loss, along with reducing inter-node communication for improving/reducing bandwidth overhead.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a one or more file systems to logically organize data within storage devices as one or more storage objects and provide a logical/virtual representation of how the storage objects are organized on the storage devices (e.g., a file system tailored for block-addressable storage, a file system tailored for byte-addressable storage such as persistent memory). A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
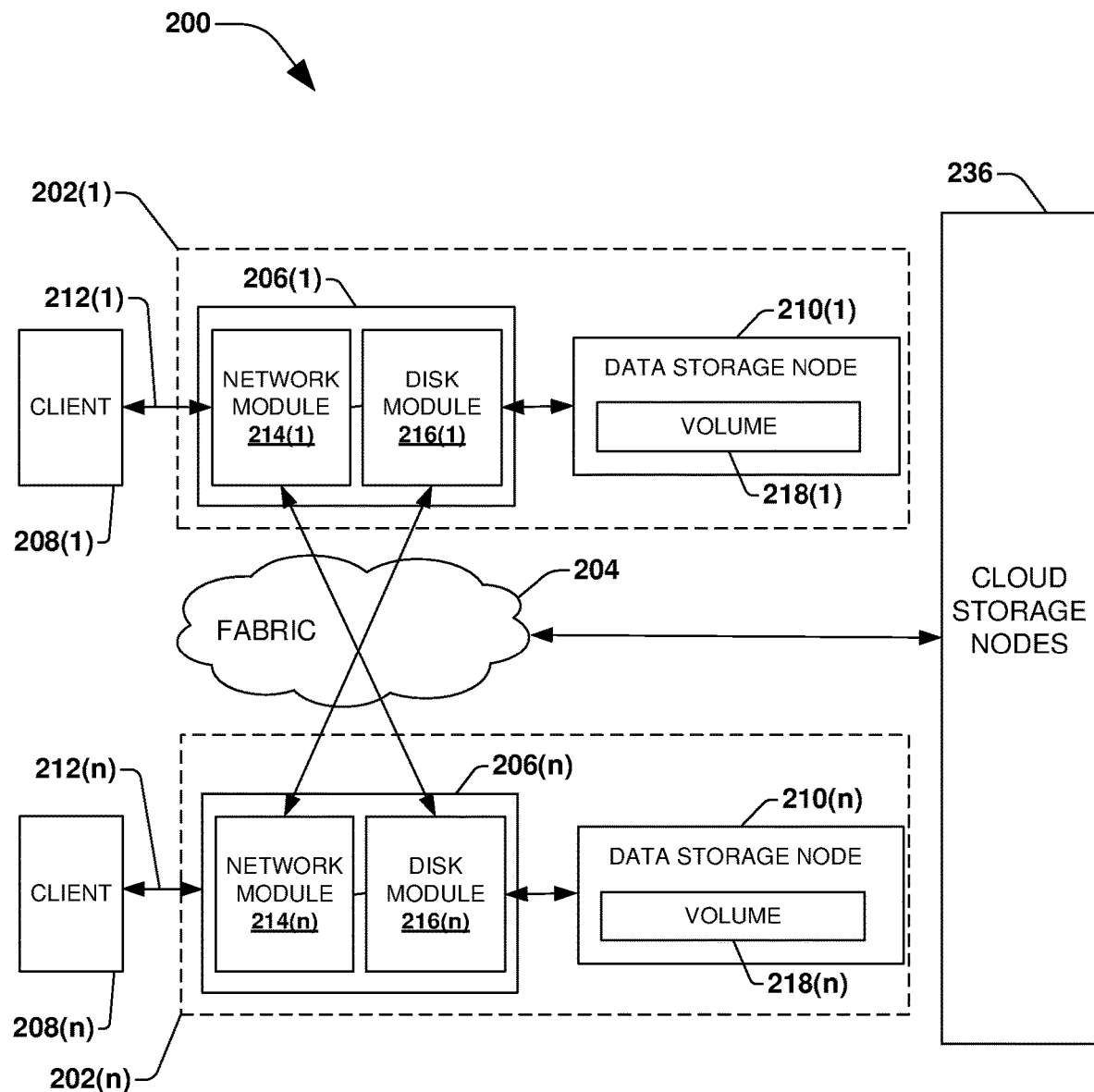
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or a combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements. In an example, control of aggregates may be switched between the node computing devices 206(1) and 206(n) in the event of a disaster or planned takeover. As provided herein, block allocation for persistent memory during aggregate transition between the node computing devices 206(1) and 206(n) is performed.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information. In an example, control of the aggregates stored within the data storage devices 210(1)-210(n) may be switched between the node computing devices 206(1) and 206(n) in the event of a disaster or planned takeover. As provided herein, block allocation for persistent memory during aggregate transition between the node computing devices 206(1) and 206(n) is performed.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
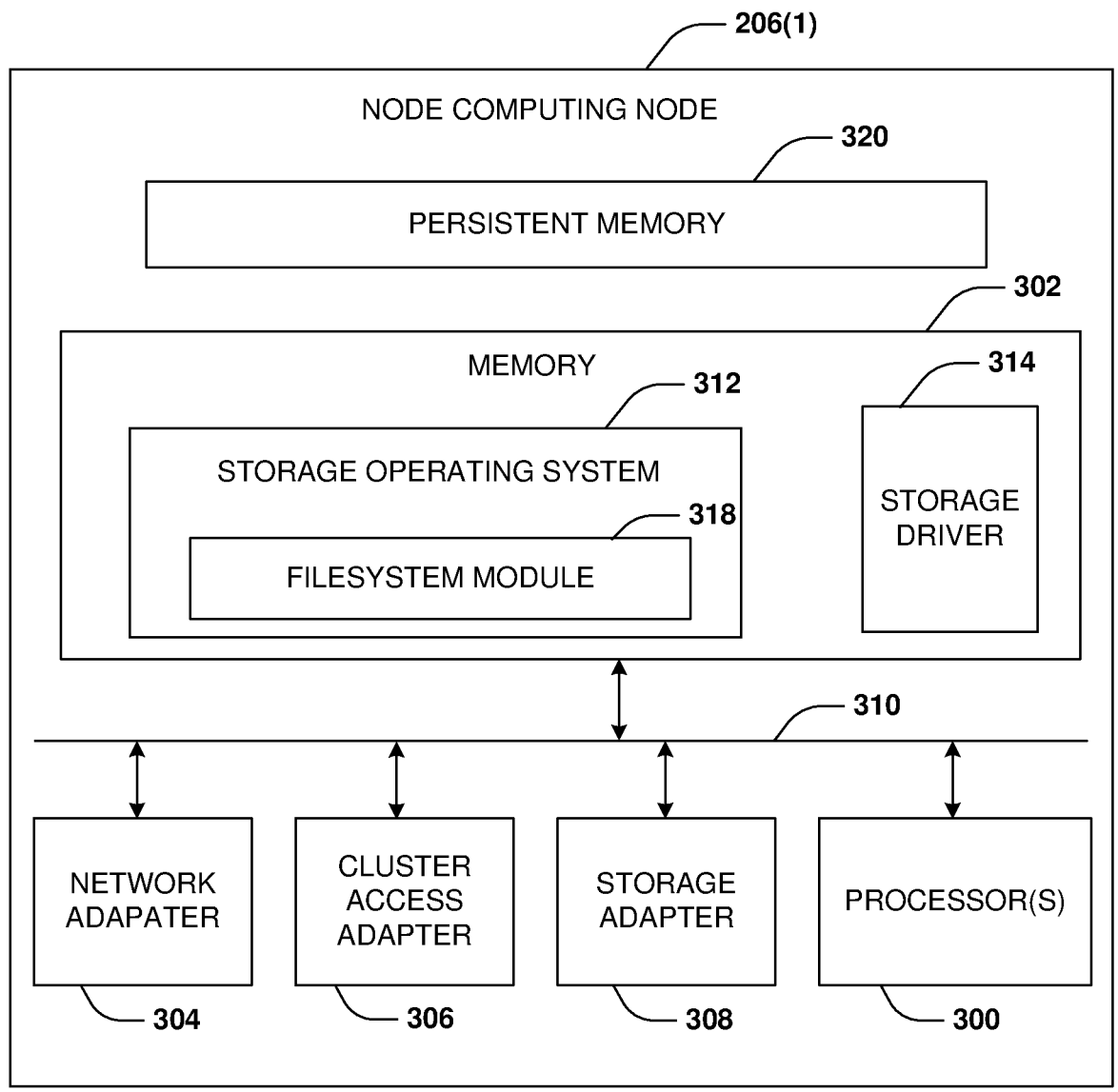
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1). In an example, a file system may be implemented for persistent memory.

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

In the example, the node computing device 206(1) comprises persistent memory 320. The persistent memory 320 comprises a plurality of pages within which data can be stored. The plurality of pages may be indexed by page block numbers.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example block allocation for persistent memory during aggregate transition as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
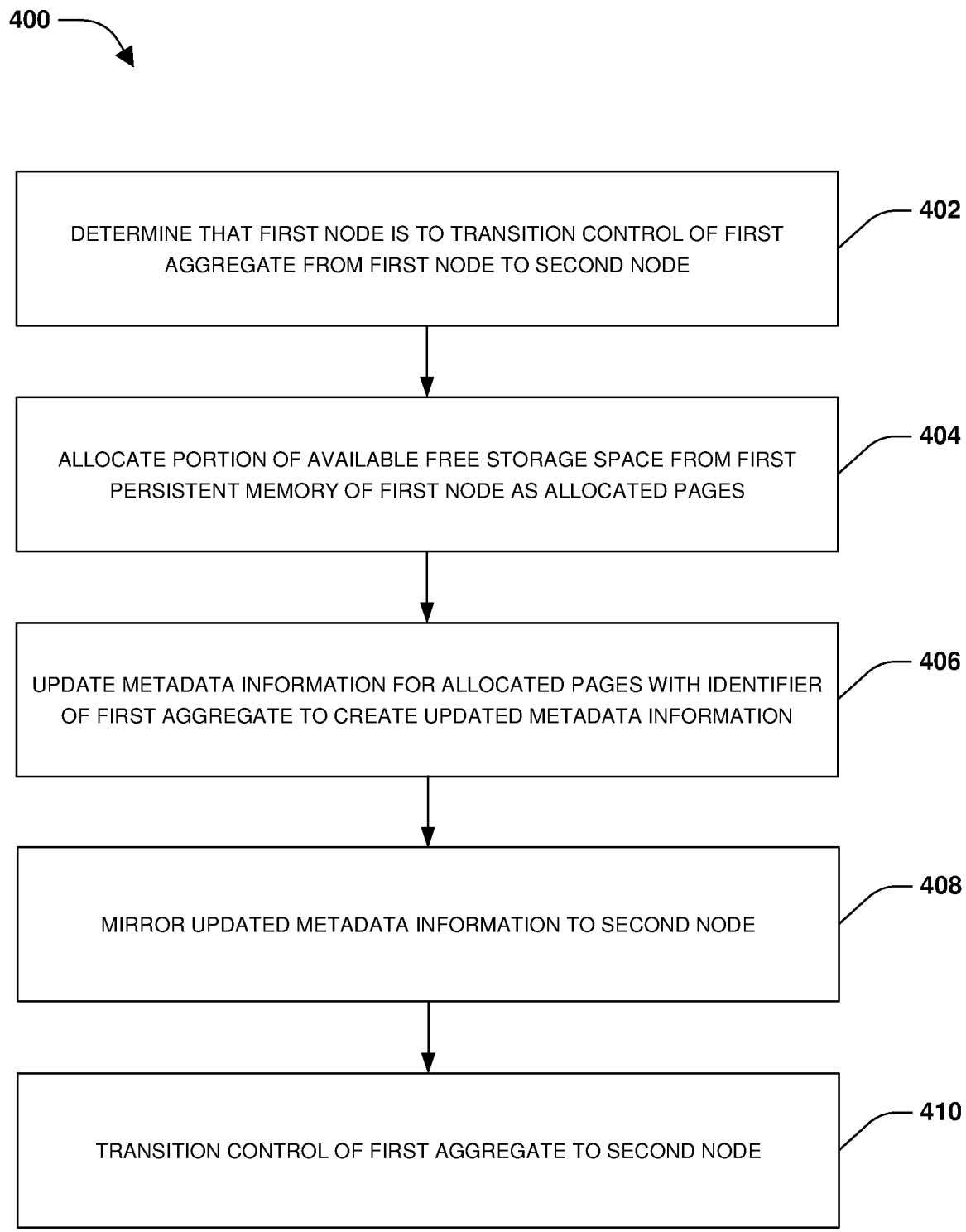
FIG. 4 is a flow chart illustrating an example method for block allocation for persistent memory during aggregate transition.

One embodiment of block allocation for persistent memory during aggregate transition is illustrated by an exemplary method 400 of FIG. 4, which is further described in conjunction with system 500 of FIGS. 5A-5G. A node (A) 502 may be paired with a node (B) 524, such as where the node (A) 502 and the node (B) 524 are a high availability node pair that can provide takeover and giveback functionality in order to provide clients with non-disruptive access to data in the event one of the nodes fails. The node (A) 502 and/or the node (B) 524 may be implemented as a server, a virtual machine (e.g., a storage virtual machine hosted within a cloud computing environment), software such as software as a service (SaaS), hardware, or a combination thereof.

Figure 5A:
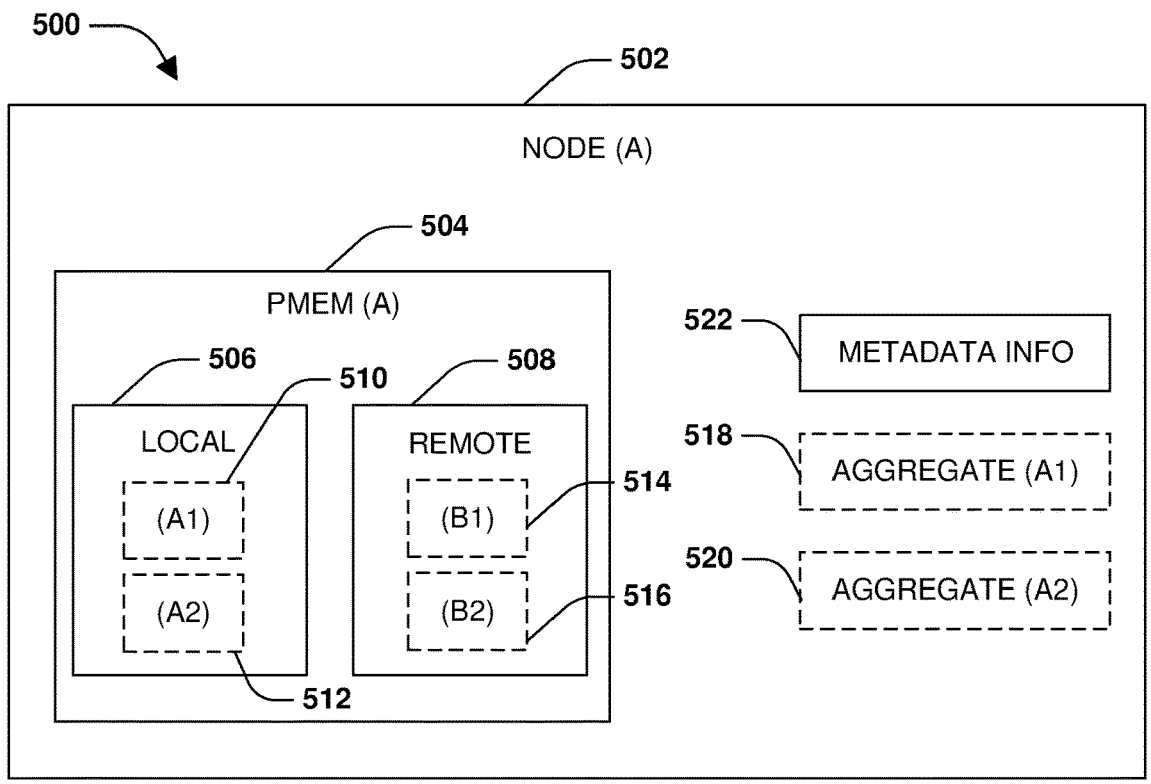
FIG. 5A is a block diagram illustrating an example system for block allocation for persistent memory during aggregate transition, where a node (A) and a node (B) are operating under normal operation.
Figure 5A:
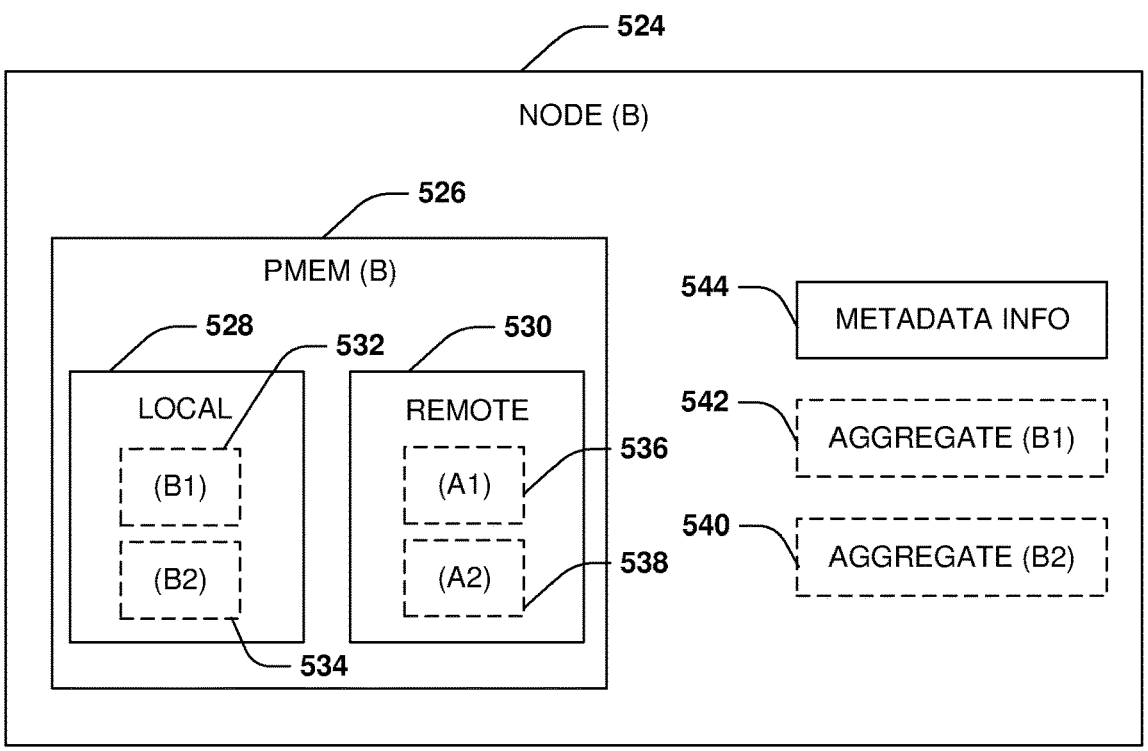

The node (A) 502 may originally host and control an aggregate (A1) 518, an aggregate (A2) 520, and/or other local aggregates within which the node (A) 502 may store data on behalf of client devices, as illustrated by FIG. 5A. The node (A) 502 may store at least some data of the aggregate (A1) 518 within a first local partition 506 of a persistent memory (A) 504 of the node (A) 502 as aggregate (A1) data 510. For example, the persistent memory (A) 504 may provide lower latency and improved performance compared to other storage available to the node (A) 502, such as disk drives, cloud storage, solid state drives, etc. Thus, certain data may be stored within the persistent memory (A) 504 such as recently accessed data, frequently accessed data, data predicted to be accessed within a threshold time span, etc. The node (A) 502 may store at least some data of the aggregate (A2) 520 within the first local partition 506 of the persistent memory (A) 504 as aggregate (A2) data 512. During normal operation, the first local partition 506 may not be partitioned, such that there is no hard partition to separate/divide the first local partition 506 for separately storing and partitioning the aggregate (A1) data 510 from the aggregate (A2) data 512.

The node (B) 524 may originally host and control an aggregate (B1) 542, an aggregate (B2) 540, and/or other local aggregates within which the node (B) 524 may store data on behalf of client devices. The node (B) 524 may store at least some data of the aggregate (B1) 542 within a second local partition 528 of a persistent memory (B) 526 of the node (B) 524 as aggregate (B1) data 532. For example, the persistent memory (B) 526 may provide lower latency and improved performance compared to other storage available to the node (B) 524, such as disk drives, cloud storage, solid state drives, etc. Thus, certain data may be stored within the persistent memory (B) 526 such as recently accessed data, frequently accessed data, data predicted to be accessed within a threshold time span, etc. The node (B) 524 may store at least some data of the aggregate (B2) 540 within the second local partition 528 of the persistent memory (B) 526 as aggregate (B2) data 534. During normal operation, the second local partition 528 may not be partitioned, such that there is no hard partition to separate/divide the second local partition 528 for separately storing and partitioning the aggregate (B1) data 532 from the aggregate (B2) data 534.

In order to provide client with non-disruptive access to data within the aggregates hosted by the nodes, the nodes need access to up-to-date data of the other nodes, such as data stored within a persistent memory of a partner node. Accordingly, the persistent memory (A) 504 of the node (A) 502 comprises a first remote partition 508. The aggregate (B1) data 532 is mirrored from the second local partition 528 of the persistent memory (B) 526 of the node (B) 524 into the first remote partition 508 of the persistent memory (A) 504 of the node (A) 502 as mirrored aggregate (B1) data 514. The aggregate (B2) data 534 is mirrored from the second local partition 528 of the persistent memory (B) 526 of the node (B) 524 into the first remote partition 508 of the persistent memory (A) 504 of the node (A) 502 as mirrored aggregate (B2) data 516.

Similarly, the persistent memory (B) 526 of the node (B) 524 comprises a second remote partition 530. The aggregate (A1) data 510 is mirrored from the first local partition 506 of the persistent memory (A) 504 of the node (A) 502 into the second remote partition 530 of the persistent memory (B) 526 of the node (B) 524 as mirrored aggregate (A1) data 536. The aggregate (A2) data 512 is mirrored from the first local partition 506 of the persistent memory (A) 504 of the node (A) 502 into the second remote partition 530 of the persistent memory (B) 526 of the node (B) 524 as mirrored aggregate (A2) data 538.

The node (A) 502 may maintain various metadata information 522 regarding the persistent memory (A) 504. In an embodiment, the metadata information 522 may indicate whether a page within the persistent memory (A) 504 is reserved for use by an aggregate. In another embodiment, the node (A) 502 may maintain free lists of free pages within the first local partition 506 and the first remote partition 508 that are available to allocate for storing data of the aggregates (e.g., a list of page block numbers indexing free pages that do not comprise data referenced by at least one of an active file system or snapshots of the active file system).

As the node (A) 502 processes I/O directed to the aggregate (A1) 518 and/or the aggregate (A2) 520 using the first local partition 506, data associated with the I/O (e.g., data being written to the aggregate (A1) 518 and/or the aggregate (A2) 520) is mirrored into the second remote partition 530 of the persistent memory (B) 526 of the node (B) 524. Thus, if the node (A) 502 fails, the node (B) 524 will have access to up-to-date data of the aggregate (A1) 518 and the aggregate (A2) 520 within the second remote partition 530 for taking over subsequent processing I/O directed to the aggregate (A1) 518 and the aggregate (A2) 520 in place of the failed node (A) 502.

Similarly, as the node (B) 524 processes I/O directed to the aggregate (B1) 542 and/or the aggregate (B2) 540 using the second local partition 532, data associated with the I/O (e.g., data being written to the aggregate (B1) 542 and/or the aggregate (B2) 540) is mirrored into the first remote partition 508 of the persistent memory (A) 504 of the node (A) 502. Thus, if the node (B) 524 fails, the node (A) 502 will have access to up-to-date data of the aggregate (B1) 542 and the aggregate (B2) 540 within the first remote partition 508 for taking over subsequent processing I/O directed to the aggregate (B1) 542 and the aggregate (B2) 540 in place of the failed node (B) 524.

Figure 5B:
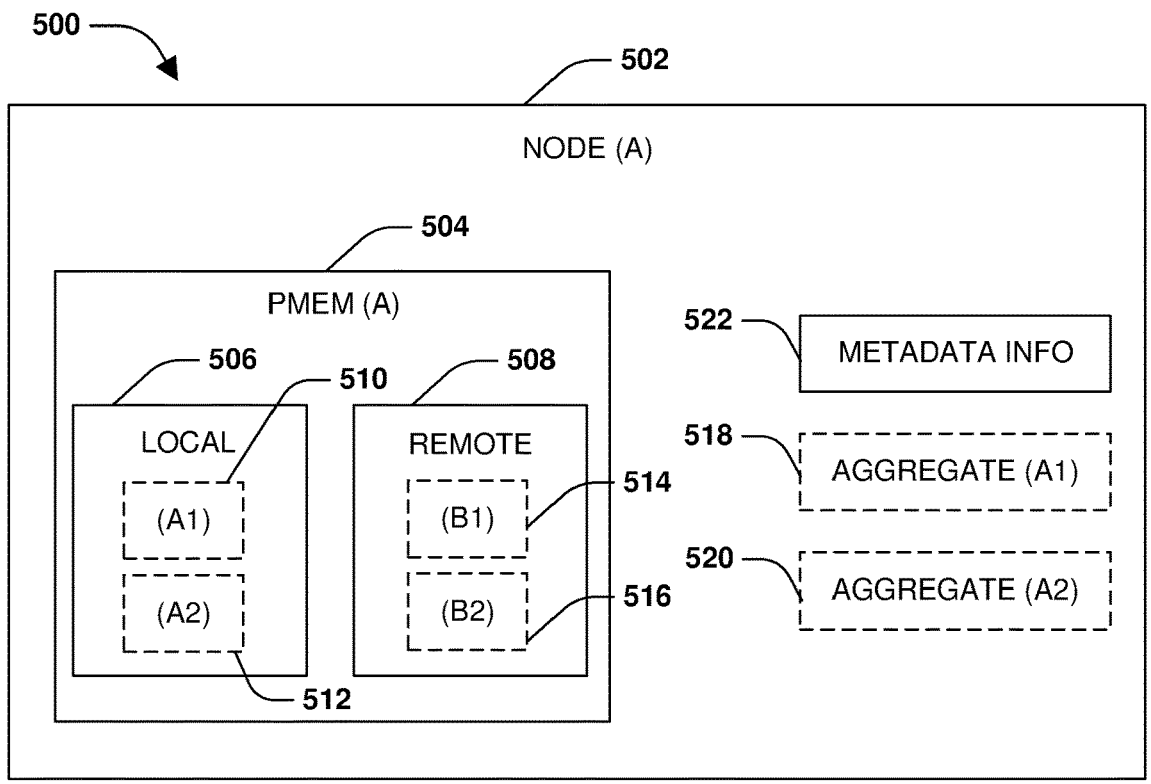
FIG. 5B is a block diagram illustrating an example system for block allocation for persistent memory during aggregate transition, where a node (B) fails.
Figure 5B:
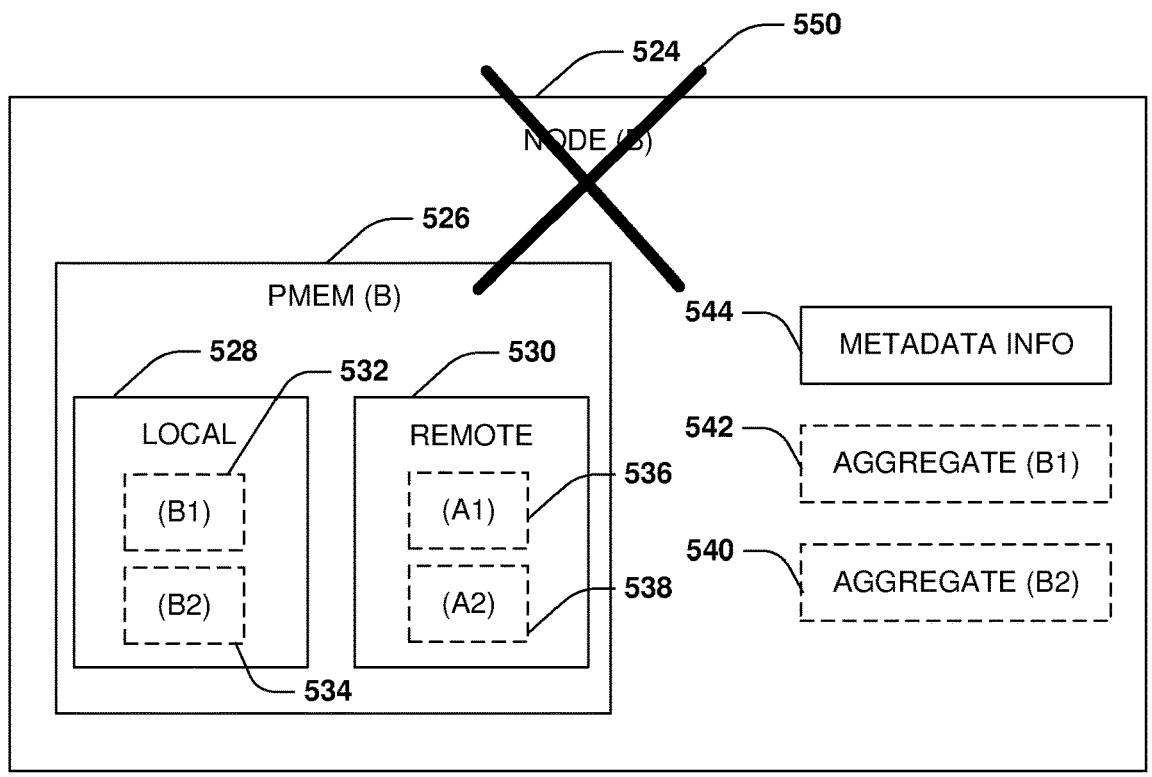
Figure 5C:
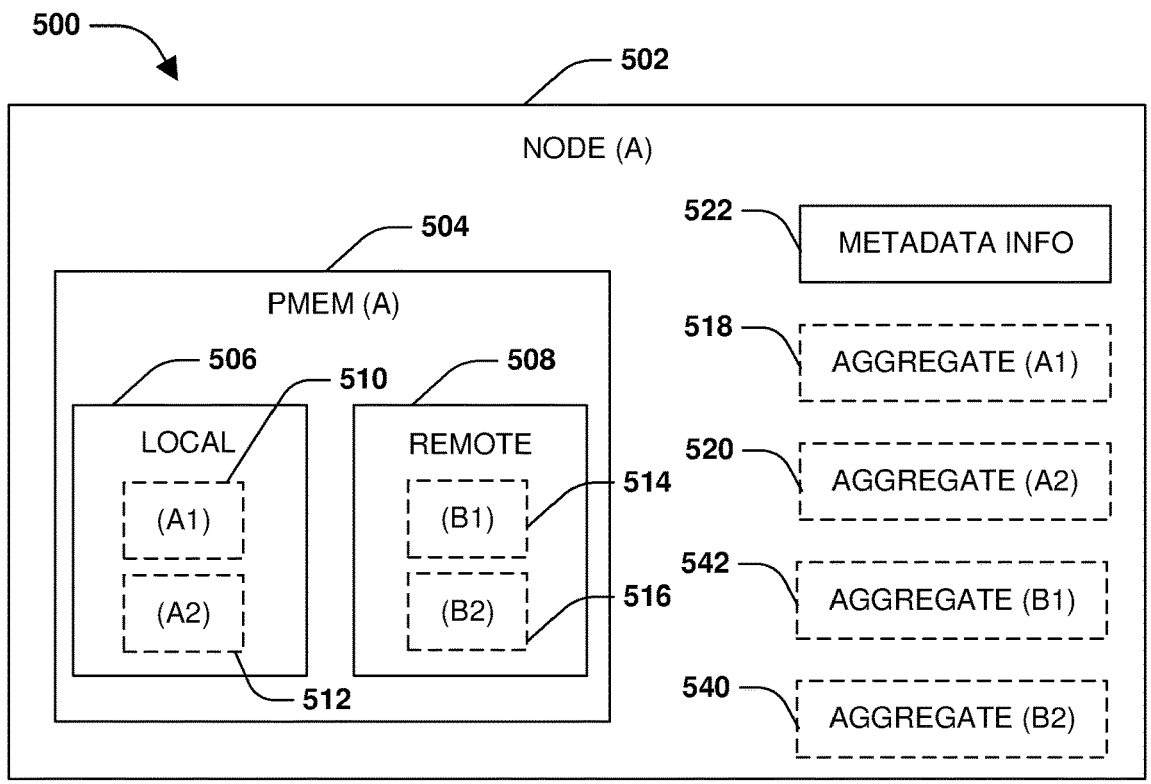
FIG. 5C is a block diagram illustrating an example system for block allocation for persistent memory during aggregate transition, where a node (A) takes over an aggregate (B1) and an aggregate (B2).
Figure 5C:
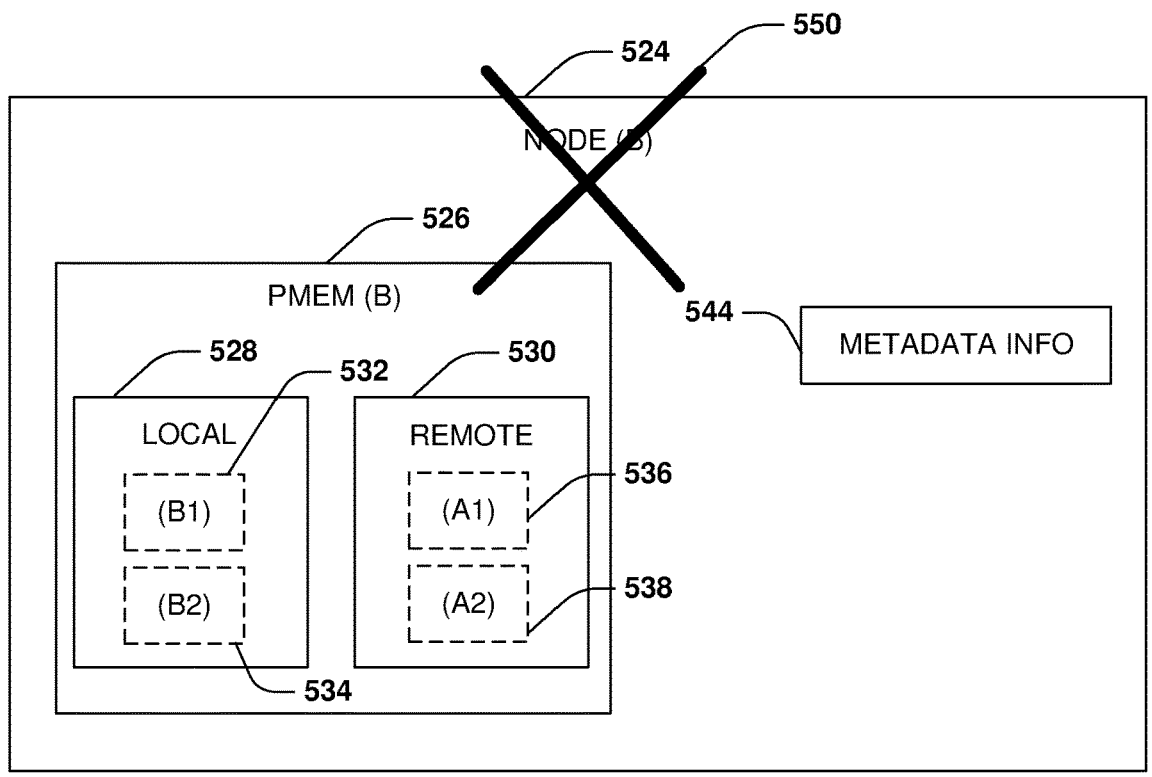

FIG. 5B illustrates an embodiment of the node (B) 524 failing 550. In an embodiment, the node (A) 502 may detect the failure 550 of the node (B) 524 through various mechanisms, such as by detecting a loss of a heartbeat signal otherwise generated by the node (B) 524 during normal operation of the node (B) 524. It may be appreciated that various mechanism may be used to determine whether a node has failed or is operational. In response to detecting the failure 550 of the node (B) 524, the node (A) 502 performs a takeover procedure to take over control of the aggregate (B1) 542 and/or the aggregate (B2) 540 from the node (B) 524, as illustrated by FIG. 5C. Because the node (B) 524 has failed, the node (A) 502 will take control of the aggregate (B1) 542 and the aggregate (B2) 540 so that the node (A) 502 can process I/O directed to the aggregate (B1) 542 and the aggregate (B2) 540 that would otherwise have been processed by the node (B) 524 during normal operation. As part of the takeover procedure, the node (A) 502 evaluates the mirrored aggregate (B1) data 514 and the mirrored aggregate (B2) data 516 within the first remote partition 508 of the persistent memory (A) 504 to build a free pages list of free pages (e.g., a list of page block numbers of the free pages) of the first remote partition 508 that are available for subsequent allocation by the node (A) 502 for storing data of I/O directed to the aggregate (B1) 542 and/or the aggregate (B2) 540.

Once the takeover procedure has completed, the node (A) 502 processes I/O directed to the aggregate (A1) 518 using the first local partition 506 of the persistent memory (A) 504 of the node (A) 502. The node (A) 502 processes I/O directed to the aggregate (A2) 520 using the first local partition 506 of the persistent memory (A) 504 of the node (A) 502. The node (A) 502 processes I/O directed to the aggregate (B1) 542 using the first remote partition 508 of the persistent memory (A) 504 of the node (A) 502. The node (A) 502 processes I/O directed to the aggregate (B2) 540 using the first remote partition 508 of the persistent memory (A) 504 of the node (A) 502. In this way, the aggregate (A1) data 510, the aggregate (A2) data 512, the aggregate (B1) data 514, and/or the aggregate (B2) data 516 may change over time based upon the node (A) 502 processing write commands, delete commands, and/or other commands that modify such data.

Figure 5D:
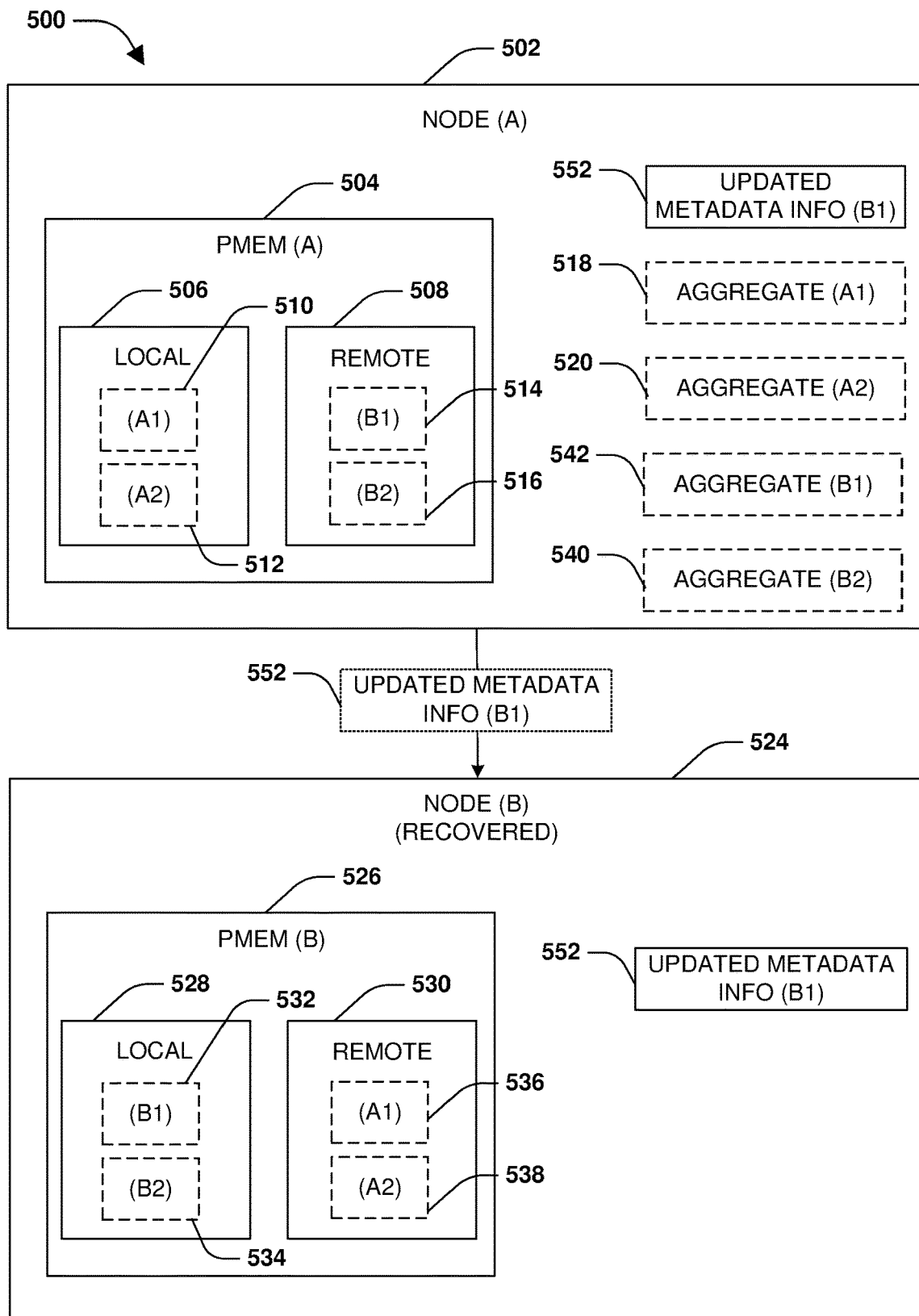
FIG. 5D is a block diagram illustrating an example system for block allocation for persistent memory during aggregate transition, where a node (B) recovers from a failure and a node (A) updates metadata information for an aggregate (B1).

At some point in time, the node (B) 524 recovers from the failure 550, as illustrated by FIG. 5D. At 402 (of FIG. 4's exemplary method 400), a determination is made that the node (A) 502 is to transition control of the aggregate (B1) 542 and/or the aggregate (B2) 540 back from the node (A) 502 to the node (B) 524. While embodiments of FIG. 4's method 400 are described with respect to a giveback procedure, they may also apply to takeover procedures. However, discussion of FIG. 4's method 400 will be done with respect to a giveback procedure for sake of demonstration. Various indicators may trigger the determination that the node (A) 502 is to transition control of the aggregate (B1) 542 and/or the aggregate (B2) 540 to the node (B) 524. In an embodiment, the node (B) 524 may transmit a request to the node (A) 502 to perform a giveback procedure of the aggregate (B1) 542 and/or the aggregate (B2) 540. In another embodiment, the node (A) 502 may detect that the node (B) 524 has recovered from the failure 550, and thus inquire with node (B) 524 as to whether a giveback procedure of the aggregate (B1) 542 and/or the aggregate (B2) 540 should be performed. In this way, the node (A) 502 may determine that the giveback procedure is to be implemented to return control of the aggregate (B1) 542 and/or the aggregate (B2) 540 from the node (A) 502 to the node (B) 524.

Once the node (B) 524 has recovered from the failure 550 (e.g., before the giveback procedure has commenced or completed), current data of the mirrored aggregate (B1) data 514 and/or the mirrored aggregate (B2) data 516 is resynchronized from the first remote partition 508 of the persistent memory (A) 504 of the node (A) 502 into the second local partition 528 of the persistent memory (B) 526 of the node (B) 524. In an embodiment, a byte-by-byte resynchronization is performed to resynchronize changes made to the aggregate (B1) 542 and/or the aggregate (B2) 540 while controlled by the node (A) 502 to the second local partition 528 of the persistent memory (B) 526 of the node (B) 524. In this way, a resynchronization process is performed to resynchronize current data of the mirrored aggregate (B1) data 514 and/or the mirrored aggregate (B2) data 516 from the first remote partition 508 of the persistent memory (A) 504 of the node (A) 502 into the second local partition 528 of the persistent memory (B) 526 of the node (B) 524.

Furthermore, mirroring of incoming I/O operations directed to the aggregate (B1) 541 and/or the aggregate (B2) 540 is performed (e.g., based on the node (A) 502 knowing that node (B) 524 is recovered). In this way, the mirrored aggregate (B1) data 514 of the aggregate (B1) 542 and/or the mirrored aggregate (B2) data 516 of the aggregate (B2) 540 being modified by I/O operations being processed by the node (A) 502 using the first remote partition 508 of the persistent memory (A) 504 of the node (A) 502 is being mirrored to the second local partition 528 of the persistent memory (B) 526 of the node (B) 524. For example, the node (A) 502 may receive a write operation from a client device before the giveback procedure has completed. The write operation may target the aggregate (B1) 542 in order to write data to the aggregate (B1) 542. Because the node (A) 502 has control over the aggregate (B1) 542, the node (A) 502 writes the data to the mirrored aggregate (B1) data 514 within the first remote partition 508 of the persistent memory (A) 504 of the node (A) 502. The node (A) 502 also mirrors that data into the aggregate (B1) data 532 within the second local partition 528 of the persistent memory (B) 526 of the node (B) 524 as part of processing the write operation. In this way, data of incoming operations is mirrored to the second local partition 528 of the persistent memory (B) 526 of the node (B) 524 (e.g., before the giveback procedure has commenced or completed).

Once the node (A) 502 has determined that the giveback procedure is to be implemented to give back control of the aggregate (B1) 542 and/or the aggregate (B2) 540 from the node (A) 502 to the node (B) 524, the node (A) 502 may initiate giveback of the aggregate (B1) 542 and/or the aggregate (B2) 540 one at a time. In an embodiment, the node (A) 502 initiates giveback of the aggregate (B1) 542 to the node (B) 524. As part of the giveback, soft partitions (e.g., the allocation/reservation of certain free pages for use by the aggregate (B1) 542 and the allocation/reservation of different free pages for use by the aggregate (B2) 540) are created in the event control of one of the aggregates does not get transitioned to the node (B) 524, and thus the node (B) 524 would be serving I/O for that aggregate while the node (A) 502 would be serving I/O for the other aggregate. In that event, each node will now allocate different free pages to store data of the aggregate that node controls, thus avoiding instances of data corruption and loss where each node could otherwise allocate the same free page to store different data of the different aggregates.

At 404, the node (A) 502 allocates a portion of available free storage space from the first remote partition 508 of the persistent memory (A) 504 of the node (A) 502. For example, the persistent memory (A) 504 may be comprised of pages within which data can be stored. The pages may be indexed by page block numbers (e.g., a first page having a first page block number, a second page having a second page block number, etc.). A page may be a free page that is available for storing data, such as because the free page does not comprise data or comprises data that is no longer referenced by an active file system and snapshots of the active file system. A page may be a used page that is unavailable for storing data, such as because the used page comprises data currently referenced by an active file system and/or one or more snapshots of the active file system.

The portion of available free storage space may be allocated as a set of free pages within the first remote partition 508 of the persistent memory (A) 504 of the node (A) 502. The set of free pages may comprise free pages that reserved for subsequent allocation and use for storing data associated with the aggregate (B1) 542 within the first remote partition 508 of the persistent memory (A) 504 of the node (A) 502. The node (A) 502 may determine what percentage of free pages within the first remote partition 508 to allocate and reserve as the portion of available free storage space for subsequent use to store data of the aggregate (B1) 542 based upon various factors such as how many other aggregates are using the first remote partition 508 for storing data. In an example, free storage space may be allocated evenly across all aggregates using the first remote partition 508. In another example, the percentage of free pages allocated for the aggregate (B1) 542 may be based upon historic storage space utilization by the aggregate (B1) 542 (e.g., if only a small percentage is historically used by the aggregate (B1) 542, then a relatively small percentage of the available free pages may be allocated/reserved for use by the aggregate (B1) 542), predicted utilization, etc. The set of free pages allocated/reserved for use by the aggregate (B1) 542 are removed from a free pages list maintained by the node (A) 502 of free pages available for use by other aggregates.

In an embodiment, because the set of free pages is merely allocated/reserved during the transition of control of aggregates from the node (A) 502 to the node (B) 524, the first remote partition 508 and the second local partition 528 have a temporary soft partition of the set of free pages for the aggregate (B1) 540. In an embodiment, this soft partition can be removed once control of the aggregate(s) has been fully transferred and onlined (e.g., made available for access by client devices) by the node (B) 524.

Implementing soft partitions, instead of hard partitions, for data of aggregates using the local partitions and remote partitions of the persistent memory (A) 504 of the node (A) 502 and the persistent memory (B) 526 of the node (B) 524 allows for the local partitions and the remote partitions to be sized and resized based upon various considerations (e.g., arbitrarily sized, sized/resized based upon current/historic/predicted utilization, etc.). Furthermore, implementing soft partitions, instead of hard partitions, for data of aggregates using the local partitions and remote partitions of the persistent memory (A) 504 of the node (A) 502 and the persistent memory (B) 526 of the node (B) 524 allows for any number of aggregates to be supported. Thus, a node may store data of any number of aggregates within a local partition and/or a remote partition of persistent memory of the node. In an embodiment, because a soft partition is merely implemented for the local partitions and remote partitions of the persistent memories during a transition window of transitioning control of aggregates between nodes, no soft partition may be used outside of the transition window (e.g., the first local partition 506 is not partitioned for use by certain aggregates, the first remote partition 508 is not partitioned for use by certain aggregates, the second local partition 528 is not partitioned for use by certain aggregates, and the second remote partition 530 is not partitioned for use by certain aggregates when aggregates are not being transitioned between nodes). In an embodiment, once all aggregates have been transitioned, then any soft partitions may be removed.

Once the portion of available free storage space of the first remote partition 508 of the persistent memory (A) 504 of the node (A) 502 has been allocated/reserved as allocated pages for the aggregate (B1) 542, the node (A) 502 may update the metadata information 522 as updated metadata information 552 for the aggregate (B1) 542 to indicate that the allocated pages are allocated/reserved for use in storing data of the aggregate (B1) 542, at 406. For example, the allocated pages that are allocated/reserved for the aggregate (B1) 542 are tagged with an identifier of the aggregate (B1) 542 to reserve the allocated pages for the aggregate (B1) 542 (e.g., page block numbers of the allocated pages may be tagged with the identifier). In this way, the updated metadata information 552 for the aggregate (B1) 542 comprises page block numbers of the allocated pages that are tagged with the identifier of the aggregate (B1) 542.

At 408, the node (A) 502 mirrors the updated metadata information 552 for the aggregate (B1) 542 to the node (B) 524. For example, the updated metadata information 552 is transmitted from the node (A) 502 to the node (B) 524, as illustrated by FIG. 5D. In this way, the node (B) 524 may store the updated metadata information 552 for the aggregate (B1) 542 so that the node (B) 524 can identify what free pages within the second local partition 528 of the persistent memory (B) 526 of the node (B) 524 to reserve for use by the aggregate (B1) 542 once control of the aggregate (B1) 542 has been transitioned form the node (A) 502 to the node (B) 524. In this way, the node (B) 524 may construct a free pages list for the aggregate (B1) 542 (e.g., a list of page block numbers of free pages that are allocated/reserved for use by the node (B) 524 for storing data of the aggregate (B1) 542) by adding free pages (e.g., page block numbers of the free pages) tagged with the identifier of the aggregate (B1) 542 into the free pages list for the aggregate (B1) 542 and excluding other pages from the free pages list for the aggregate (B1) 542. Thus, the allocated pages, tagged with the identifier of the aggregate (B1) 542 within the updated metadata 522 for the aggregate (B1) 542, are added into the free pages list as being allocated/reserved for use to store data of the aggregate (B1) 542 within the second local partition 528 of the persistent memory (B) 526 of the node (B) 524. In this way, both the node (A) 502 and the node (B) 524 have reserved the same free pages for use in storing data of the aggregate (B1) 542.

New block allocations for the aggregate (B1) 542 (e.g., allocations of free pages to store data of the aggregate (B1) 542) are directed to the allocated pages within the free pages list that were added to the free pages list based upon the allocated pages being tagged with the identifier of the aggregate (B1) 542 (e.g., until completion of the giveback of all aggregates). Because both the node (A) 502 and the node (B) 524 have the same allocated pages that are reserved for use by the aggregate (B1) 542 to store data of the aggregate (B1) 542 into the second local partition 528 of the persistent memory (B) 526 of the node (B) 524 and into the first remote partition 508 of the persistent memory (A) 508 of the node (A) 502, data corruption and loss is avoided. Data corruption is avoided where the node (A) 502 and the node (B) 524 could otherwise allocate the same page having the same page block number to store different data (e.g., node (A) 502 could store data of the aggregate (B2) 540 into a free page having a same page block number as a free page at which node (B) 524 stores data of the aggregate (B1) 524 after control of the aggregate (B1) 542 has been transitioned to the node (B) 524) if the node (A) 502 and the node (B) 524 did not have the same allocated pages for the aggregate (B1) 542. Data corruption would result because the first remote partition 508 of the persistent memory (A) 504 of the node (A) 502 and the second local partition 528 of the persistent memory (B) 526 of the node (B) 524 are to be mirrors of one another comprising the exact same data. Either the free page within the first remote partition 508 and the free page within the second local partition 528 will comprise different data, or due to mirroring one of the free pages will be overwritten and thus result in data loss. However, since both the node (A) 502 and the node (B) 524 have the same allocated pages for the aggregate (B1) 542, data corruption and loss is avoided.

Figure 5E:
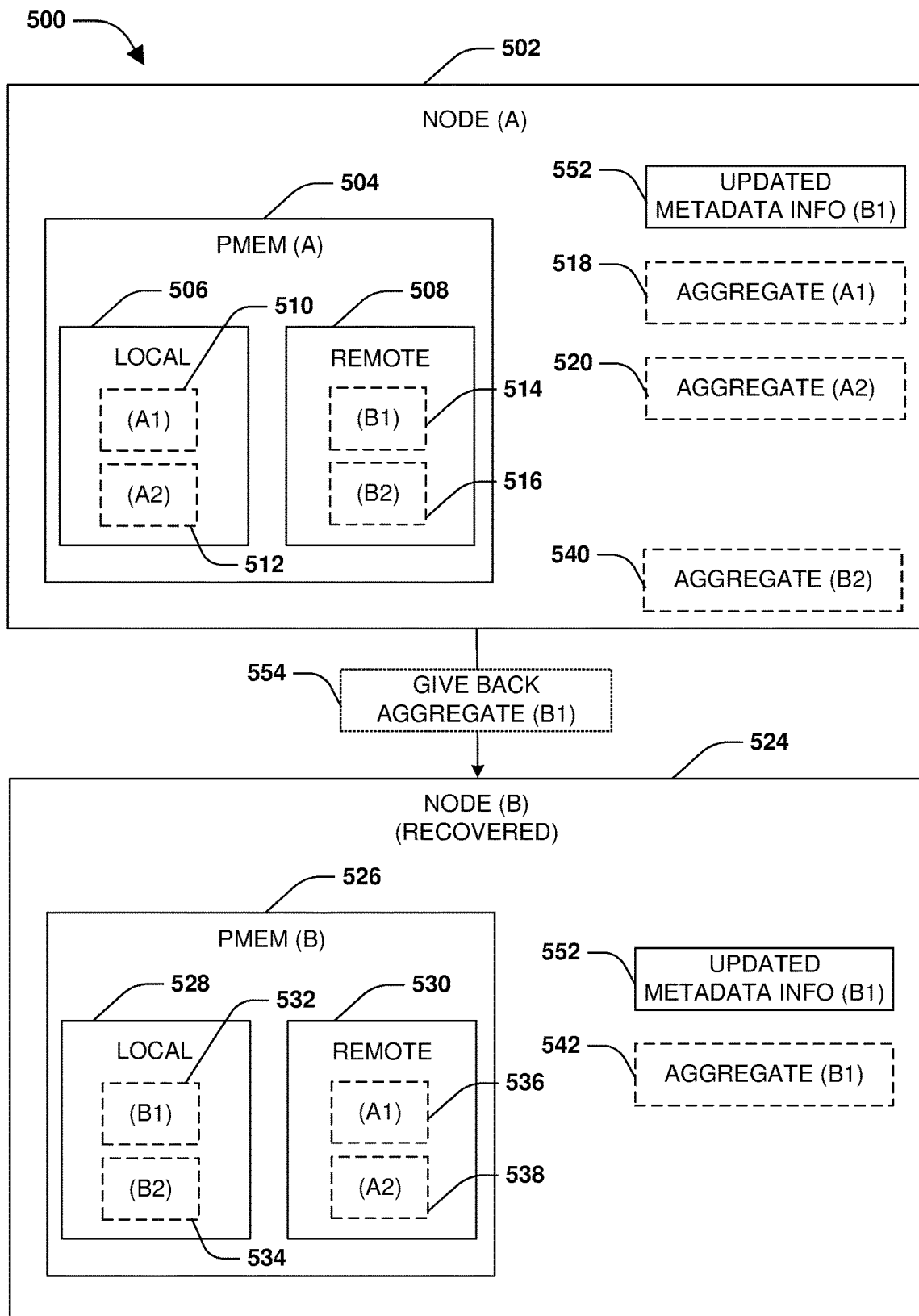
FIG. 5E is a block diagram illustrating an example system for block allocation for persistent memory during aggregate transition, where a node (A) gives back an aggregate (B1) to a node (B).

At 410, control of the aggregate (B1) 542 is given back 554 from the node (A) 502 to the node (B) 524, as illustrated by FIG. 5E. In an embodiment, control of the aggregate (B1) 542 is given back 554 to the node (B) 524 upon confirmation that the node (B) 524 has constructed the free pages list for the aggregate (B1) 542 based upon the updated metadata information 552 for the aggregate (B1) 542. Once node (B) 524 has control of the aggregate (B1) 542, the node (B) 524 will actively serve I/O directed to the aggregate (B1) 542 using the allocated pages, within the free pages list, of the second local partition 528 of the persistent memory (B) 526 of the node (B) 524. Data is also actively mirrored from the second local partition 528 of the persistent memory (B) 526 of the node (B) 524 to the first remote partition 508 of the persistent memory (A) 504 of the node (A) 502 (e.g., data written to a particular page within the second local partition 528 will be mirrored to a corresponding same page within the first remote partition 508).

Figure 5F:
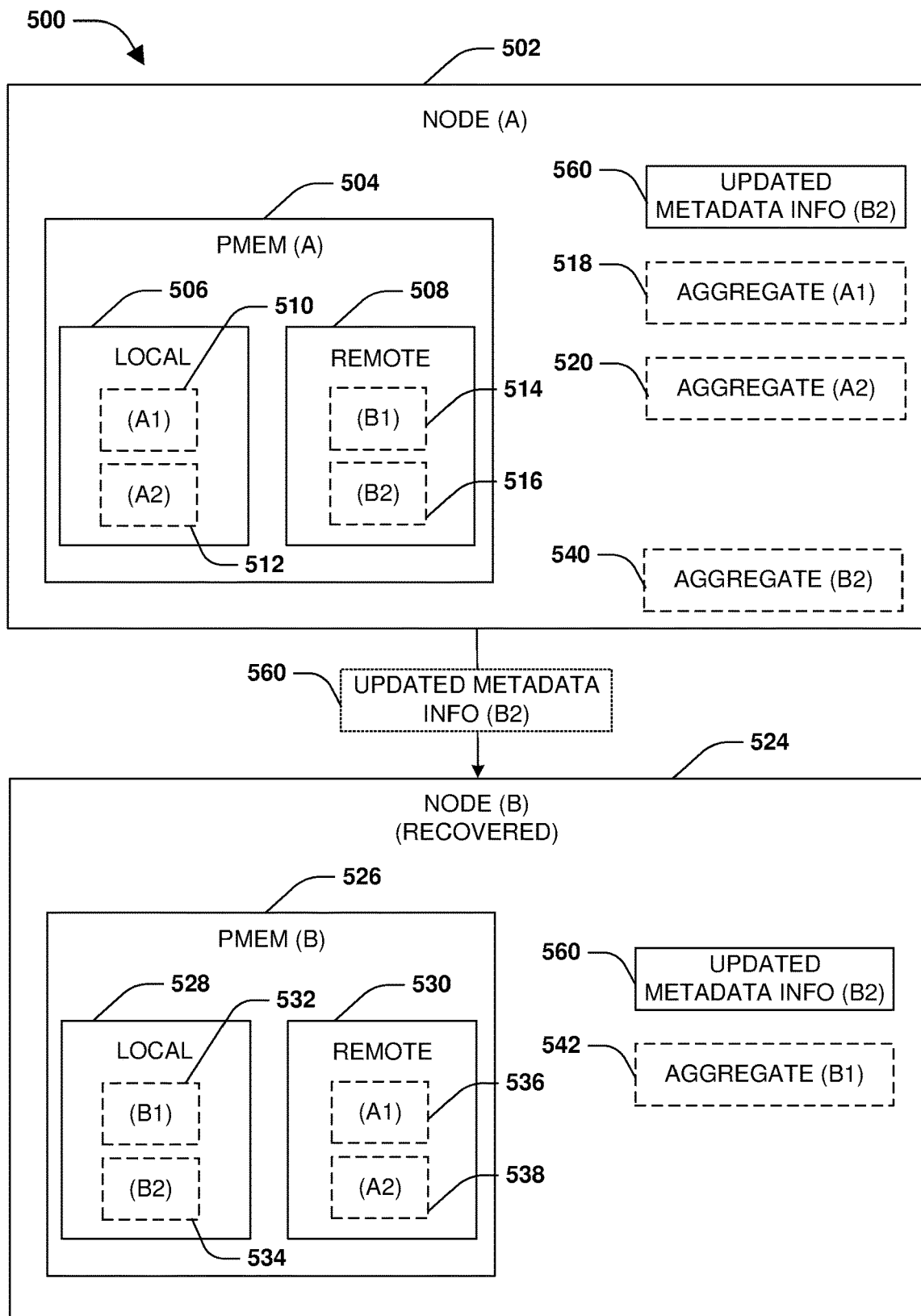
FIG. 5F is a block diagram illustrating an example system for block allocation for persistent memory during aggregate transition, where a node (A) updates metadata information for an aggregate (B2).
Figure 5G:
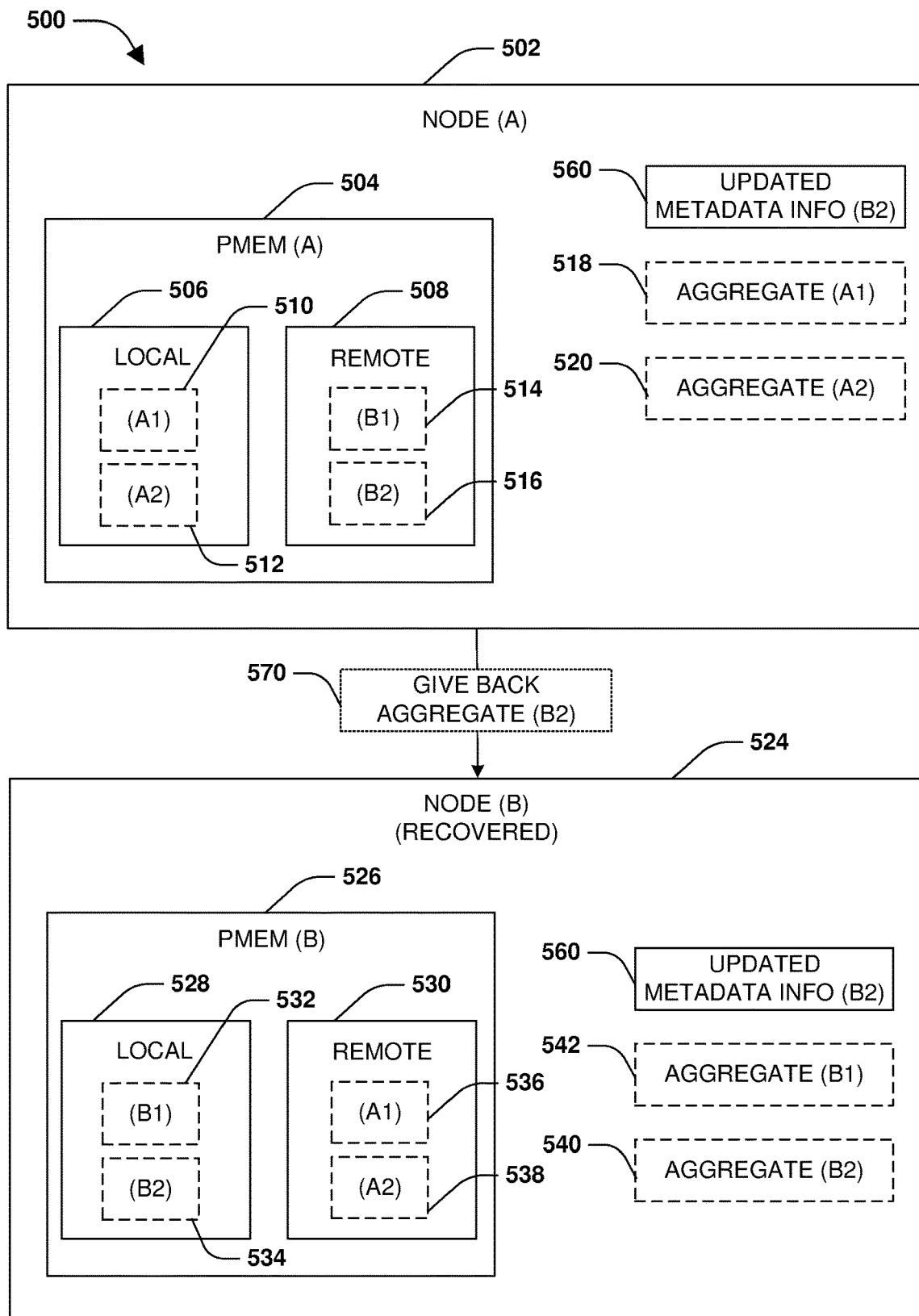
FIG. 5G is a block diagram illustrating an example system for block allocation for persistent memory during aggregate transition, where a node (A) gives back an aggregate (B2) to a node (B).

Once control of the aggregate (B1) 542 has successfully been transferred from the node (A) 502 to the node (B) 524, the node (A) 502 may initiated transfer of control of the aggregate (B2) 540 to the node (B) 524, as illustrated by FIGS. 5F and 5G. Transfer of control of the aggregate (B2) 540 may be performed in a similar manner as how control of the aggregate (B1) 542 was transferred to the node (B) 524. In particular, the node (A) 502 may allocate a second portion of available free storage space within the first remote partition 508 of the persistent memory (A) 504 of the node (A) 502 as second allocated pages that are allocated/reserved for the aggregate (B2) 540. The second allocated pages comprise free pages within the first remote partition 508 that are reserved for subsequent use to store data of the aggregate (B2) 540 by the node (A) 502. The second allocated pages will be different than the allocated pages that were allocated/reserved for the aggregate (B1) 542, and thus data corruption is avoided because the node (A) 502 will not allocate the same free page for use by the aggregate (B2) 540 (e.g., if control of the aggregate (B2) 540 is retained by the node (A) 502 for serving subsequent I/O directed to the aggregate (B2) 540) as a corresponding free page having a same page block number that is allocated by the node (B) 524 to store data of the aggregate (B1) 542.

The node (A) 502 updates metadata information associated with the aggregate (B2) 540 as updated metadata information (B2) 560 for the aggregate (B2) 540. The updated metadata information (B2) 560 comprises the second allocated pages (e.g., page block numbers of the second allocated pages) tagged with a second identifier of the aggregate (B2) 540. In this way, the second allocated pages are reserved for subsequent allocation to store data of the aggregate (B2) 540 within the first remote partition 508 of the persistent memory (A) 504 of the node (A) 502. The allocated pages are removed from the free pages list maintained by the node (A) 502 for the first remote partition 508. The updated metadata information (B2) 560 is mirrored from the node (A) 502 to the node (B) 524, as illustrated by FIG. 5F. The node (B) 524 constructs a free pages list for the aggregate (B2) 540 based upon the updated metadata information (B2) 560 for the aggregate (B2) 540 by including page block numbers of the second allocated pages tagged with the second identifier within the updated metadata information (B2) 560. Once the node (B) 524 has reserved the second allocated pages for the aggregate (B2) 540, the node (A) 502 transitions control of the aggregate (B2) 540 to the node (B) 524 by performing a giveback 570 of the aggregate (B2) 540, as illustrated by FIG. 5G. In this way, the node (B) 524 actively processes I/O directed to the aggregate (B2) 540 using the second local partition 528 of the persistent memory (B) 526 of the node (B) 524, while mirroring data of the I/O to the first remote partition 508 of the persistent memory (A) 504 of the node (A) 502.

Once the transition of the aggregates has completed, the soft partition of the local partitions and the remote partitions may be removed. The soft partitions (e.g., the allocation/reservation of certain free pages for use by the aggregate (B1) 542 and the allocation/reservation of different free pages for use by the aggregate (B2) 540) were created in the event control of one of the aggregates did not get transitioned to the node (B) 524, and thus the node (B) 524 would be serving I/O for that aggregate while the node (A) 502 would be serving I/O for the other aggregate. In that event, each node will now allocate different free pages to store data of the aggregate that node controls, thus avoiding instances of data corruption and loss where each node could otherwise allocate the same free page to store different data of the different aggregates.

In an embodiment, before the transitioning of the aggregates from the node (A) 502 to the node (B) 524 has successfully completed, available free spaces within the persistent memories of the node (A) 502 and the node (B) 524 may be monitored in the event there is a lack of free space for processing an incoming operation. If the incoming operation targets an aggregate (e.g., aggregate (B2) 540 while still controlled by the node (A) 520) for which there is a lack of available free space (e.g., a lack of free pages allocated to the aggregate (B2) 540 from the first remote partition 508) to process the incoming operation, then the incoming operation is suspended, such as queued for subsequent processing once adequate resources become available. A pace at which a scavenger process reclaims unused space (e.g., frees pages as available free pages because those pages are no longer referenced by the active file system and/or snapshots of the active file system) may be increased in response to suspending the incoming operation. In this way, available free pages allocated/reserved for the aggregate (B2) 540 may become available more quickly.

Block allocation for persistent memory during aggregate transition has been described, with respect to FIGS. 5A-5G, in relation to the node (A) 502 performing a giveback procedure after the node (B) 524 recovered from the failure 550. It may be appreciated that block allocation for persistent memory during aggregate transition can be performed in a similar/same manner for other scenarios. For example, block allocation for persistent memory during aggregate transition may be performed during a takeover, such as a planned takeover where a first node is to takeover aggregates one by one from a second node that is still operational. For each aggregate whose control is being transitioned from the second node to the first node, the second node may allocate pages within persistent memory of the second node as being reserved for an aggregate being transitioned to the first node. Metadata information for the allocated pages is updated with an identifier of the aggregate to create updated metadata information that is mirrored to the first node. Once the first node has allocated/reserved the allocated pages from a persistent memory of the first node, the second node transitions control of the aggregate to the first node. In this way, block allocation for persistent memory during aggregate transition may be performed for the takeover procedure in a same/similar manner as for the giveback procedure.

Figure 6:
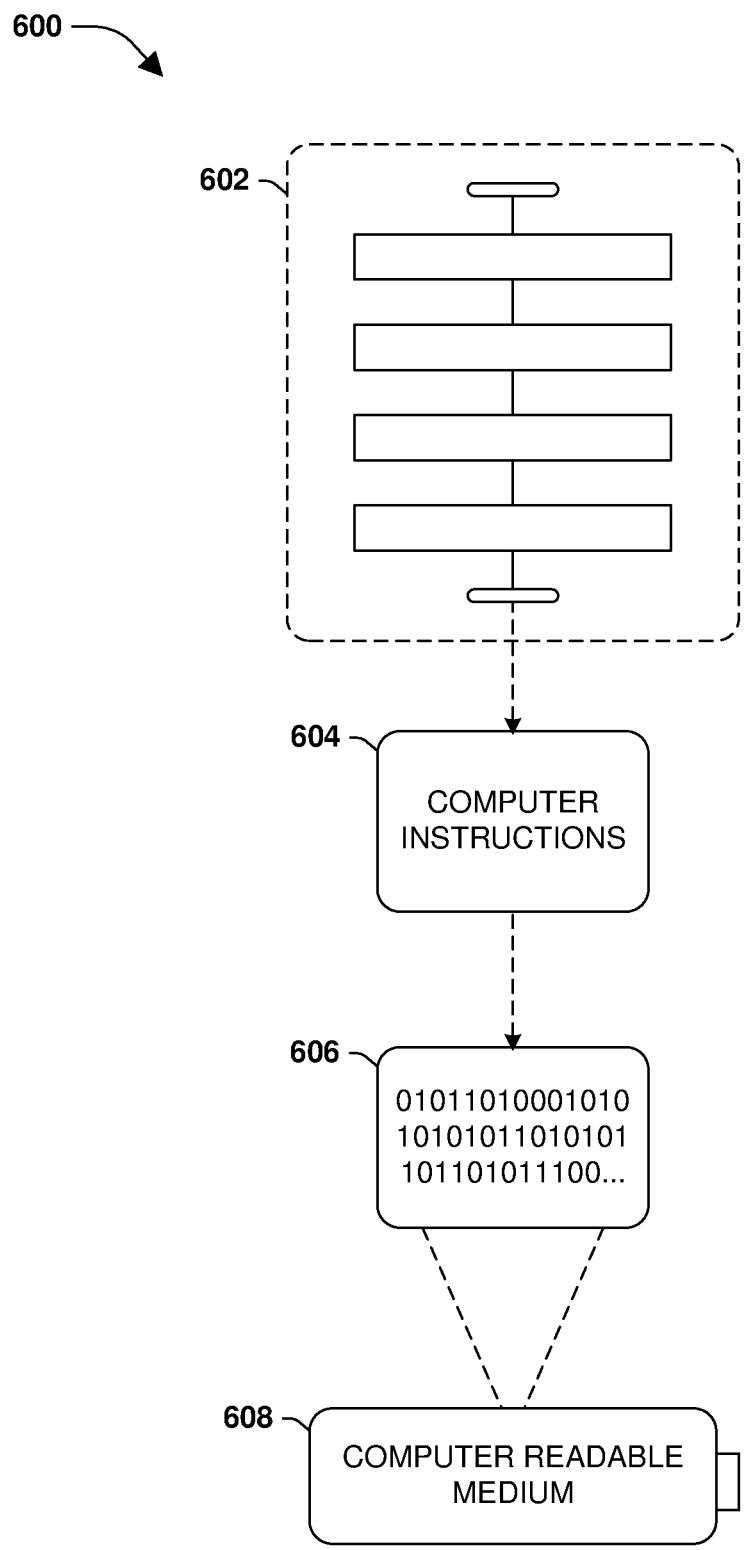
FIG. 6 is an example of a computer readable medium in which an embodiment may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A-5G, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system comprising:
a first node comprising a first persistent memory, wherein the first persistent memory includes a first local partition and a first remote partition, wherein the first node utilizes the first local partition to service client I/O, and wherein the first node is configured to:
    mirror data from pages within the first local partition to a second remote partition of a second persistent memory of a second node;
    recover from a failure where the second node took over control for the first node during the failure of the first node, wherein the second node services subsequent client I/O on behalf of the first node using the data mirrored from the first node to the second remote partition of the second persistent memory of the second node; and
    execute a resynchronization process to synchronize changes made to the second remote partition by the subsequent client I/O to the first local partition of the first persistent memory of the first node.

2. The system of claim 1, wherein the first node:
in response to the resynchronization process completing, performs a giveback procedure for the second node to give back control to the first node.

3. The system of claim 1, wherein the first node:
stores mirrored data received from the second node into pages of the first remote partition of the first persistent memory.

4. The system of claim 1, wherein the first node:
executes a byte by byte resynchronization to synchronize the changes to the first local partition.

5. The system of claim 1, wherein control of an aggregate is transitioned to the second node in response to the first node failing, and wherein the first node:

performs the resynchronization process to synchronize changes made to the aggregate while controlled by the second node.

6. The system of claim 1, wherein the first node:
executes a scavenger to reclaim pages as available pages based upon the pages no longer being referenced by an active file system.

7. The system of claim 1, wherein the first node:
executes a scavenger to reclaim pages as available pages based upon the pages no longer being referenced by snapshots of an active file system.

8. The system of claim 1, wherein page block numbers and data of pages within the second remote partition mirrors page block numbers and data of pages within the first local partition.

9. The system of claim 1, wherein the first node:
implements a soft partition for the first persistent memory to partition the first persistent memory into a number of partitions for an arbitrary number of aggregates.

10. The system of claim 1, wherein the first node:
implements a soft partition for the first persistent memory to partition the first persistent memory into the first local partition and the first remote partition having arbitrary sizes.

11. The system of claim 1, wherein the first node:
limits new allocations, of pages from the first remote partition for an aggregate, to allocated pages having page block numbers tagged with an aggregate identifier.

12. The system of claim 1, wherein allocated pages within the first remote partition maintained by the first node for an aggregate have same page block numbers as pages within a second local partition allocated to the aggregate by the second node, and wherein data within the pages within the second local partition are mirrored to the allocated pages having the same page block numbers.

13. A method comprising:
maintaining pages of data within a first persistent memory of a first node, wherein the first persistent memory includes a first local partition and a first remote partition, wherein the first node utilizes the first local partition to service client I/O;
mirroring data from pages within the first local partition to a second remote partition of a second persistent memory of a second node;
recovering from a failure where the second node took over control for the first node during the failure of the first node, wherein the second node services subsequent client I/O on behalf of the first node using the data mirrored from the first node to the second remote partition of the second persistent memory of the second node; and
executing a resynchronization process to synchronize changes made to the second remote partition by the subsequent client I/O to the first local partition of the first persistent memory of the first node.

14. The method of claim 13, comprising:
in response to the resynchronization process completing, performing a giveback procedure for the second node to give back control to the first node.

15. The method of claim 13, comprising:
storing mirrored data received from the second node into pages of the first remote partition of the first persistent memory.

16. The method of claim 13, comprising:
executing a byte by byte resynchronization to synchronize the changes to the first local partition.

17. The method of claim 13, wherein control of an aggregate is transitioned to the second node in response to the first node failing, and wherein the method comprises:
performing the resynchronization process to synchronize changes made to the aggregate while controlled by the second node.

18. The method of claim 13, comprising:
executing a scavenger to reclaim pages as available pages based upon the pages no longer being referenced by an active file system.

19. The method of claim 13, comprising:
executing a scavenger to reclaim pages as available pages based upon the pages no longer being referenced by snapshots of an active file system.

20. A non-transitory machine readable medium comprising instructions for performing a method, which when executed by a machine, causes the machine to:
maintain pages of data within a first persistent memory of a first node, wherein the first persistent memory includes a first local partition and a first remote partition, wherein the first node utilizes the first local partition to service client I/O;
mirror data from pages within the first local partition to a second remote partition of a second persistent memory of a second node;
recover from a failure where the second node took over control for the first node during the failure of the first node, wherein the second node services subsequent client I/O on behalf of the first node using the data mirrored from the first node to the second remote partition of the second persistent memory of the second node; and
execute a resynchronization process to synchronize changes made to the second remote partition by the subsequent client I/O to the first local partition of the first persistent memory of the first node.

* * * * *